(12) United States Patent
Kuckelkorn et al.

(10) Patent No.: US 10,774,426 B2
(45) Date of Patent: Sep. 15, 2020

(54) RADIATION-SELECTIVE ABSORBER COATING AND ABSORBER TUBE WITH RADIATION-SELECTIVE ABSORBER COATING

(75) Inventors: Thomas Kuckelkorn, Jena (DE);
Kamel Silmy, Mitterteich (DE);
Sebastian Dreyer, Tirschenreuth (DE)

(73) Assignee: SCHOTT SOLAR AG, Mainz (DE)

( * ) Notice: Subject to any disclaimer, the term of this patent is extended or adjusted under 35 U.S.C. 154(b) by 1602 days.

(21) Appl. No.: 12/780,007

(22) Filed: May 14, 2010

(65) Prior Publication Data
US 2010/0294263 A1 Nov. 25, 2010

(30) Foreign Application Priority Data

May 20, 2009 (DE) .................... 10 2009 022 059

(51) Int. Cl.
| | | |
|---|---|---|
| F24S 70/30 | (2018.01) | |
| F24S 70/20 | (2018.01) | |
| F24S 20/20 | (2018.01) | |
| F24S 23/74 | (2018.01) | |
| C23C 28/00 | (2006.01) | |

(Continued)

(52) U.S. Cl.
CPC .......... *C23C 28/322* (2013.01); *C23C 28/34* (2013.01); *C23C 28/341* (2013.01); *C23C 28/345* (2013.01); *C23C 28/3455* (2013.01); *C23C 28/36* (2013.01); *F24S 20/20* (2018.05); *F24S 70/20* (2018.05); *F24S 70/30* (2018.05);
(Continued)

(58) Field of Classification Search
CPC ......... F24J 2/4652; F24J 2/485; C23C 28/322

USPC ........................................................ 126/676
See application file for complete search history.

(56) References Cited

U.S. PATENT DOCUMENTS 3,377,195 A * 4/1968 Sneesby ..................... 427/432
4,582,764 A * 4/1986 Allerd et al. ............... 428/623
(Continued)

FOREIGN PATENT DOCUMENTS

| CN | 1512119 | 7/2004 |
|---|---|---|
| CN | 1670446 | 9/2005 |

(Continued)

OTHER PUBLICATIONS

Lanxner, M., et al: "Solar Selective Absorber Coating for . . . " Proceedings of the SPIE—Optical Materials Technology for Energy Efficiency and Solar Energy Conversion IX, vol. 1272, pp. 240-249, Mar. 12-13, 1990 (in Eng.).

(Continued)

*Primary Examiner* — Avinash A Savani
*Assistant Examiner* — Deepak A Deean
(74) *Attorney, Agent, or Firm* — Collard & Roe, P.C.

(57) ABSTRACT

The radiation-selective absorber coating, in particular for an absorber tube of a parabolic trough collector, includes a reflective layer which is reflective in the infrared range, at least one barrier layer arranged below the reflective layer, at least one absorption layer arranged above the reflective layer, an antireflection layer arranged above the absorption layer and at least one adhesion-enhancing layer arranged between the barrier layer and the reflective layer. The adhesion-enhancing layer preferably is a molybdenum layer, but can also be provided by a copper, titanium, titanium oxide, or silicon layer. The adhesion-enhancing layer preferably has a thickness of 5 to 50 nm.

10 Claims, 2 Drawing Sheets

(51) Int. Cl.
*G02B 1/11* (2015.01)
*G02B 5/08* (2006.01)

(52) U.S. Cl.
CPC ................. *G02B 1/11* (2013.01); *G02B 5/08* (2013.01); *F24S 23/74* (2018.05); *Y02E 10/40* (2013.01)

(56) References Cited

U.S. PATENT DOCUMENTS

| | | | |
|---|---|---|---|
| 4,777,936 A * | 10/1988 | Arai | 126/652 |
| 5,523,132 A * | 6/1996 | Zhang et al. | 428/34.4 |
| 5,724,187 A * | 3/1998 | Varaprasad | B32B 17/06 |
| | | | 359/265 |
| 5,965,246 A * | 10/1999 | Guiselin et al. | 428/212 |
| 6,045,896 A * | 4/2000 | Boire et al. | 428/216 |
| 6,261,694 B1 * | 7/2001 | Iacovangelo | 428/412 |
| 6,632,542 B1 | 10/2003 | Mahoney et al. | |
| 6,974,976 B2 * | 12/2005 | Hollars | 257/184 |
| 7,013,887 B2 * | 3/2006 | Kuckelkorn et al. | 126/652 |
| 7,037,577 B2 * | 5/2006 | Macquart et al. | 428/216 |
| 7,793,653 B2 * | 9/2010 | Kuckelkorn et al. | 126/651 |
| 7,909,029 B2 * | 3/2011 | Kuckelkorn et al. | 126/651 |
| 8,147,969 B2 * | 4/2012 | LaBrousse et al. | 428/426 |
| 8,318,329 B2 * | 11/2012 | Silmy et al. | 428/701 |
| 2002/0073988 A1 * | 6/2002 | Reichert et al. | 126/676 |
| 2004/0147185 A1 | 7/2004 | Decroupet | |
| 2005/0181925 A1 * | 8/2005 | Kuckelkorn | F24S 10/45 |
| | | | 501/66 |
| 2005/0189525 A1 * | 9/2005 | Kuckelkorn | C23C 26/00 |
| | | | 252/582 |
| 2006/0137679 A1 * | 6/2006 | Flamm | F24J 2/204 |
| | | | 126/651 |
| 2006/0141265 A1 * | 6/2006 | Russo et al. | 428/426 |
| 2006/0177582 A1 * | 8/2006 | Chandra | C23C 10/02 |
| | | | 427/250 |
| 2007/0235023 A1 * | 10/2007 | Kuckelkorn et al. | 126/652 |
| 2007/0281171 A1 | 12/2007 | Coster et al. | |
| 2008/0121225 A1 * | 5/2008 | Kuckelkorn | C23C 28/36 |
| | | | 126/635 |
| 2008/0311389 A1 | 12/2008 | Roquiny et al. | |
| 2009/0202790 A1 * | 8/2009 | Eerden | C23C 28/00 |
| | | | 428/195.1 |
| 2009/0208761 A1 * | 8/2009 | Silmy | C23C 28/048 |
| | | | 428/448 |
| 2010/0313875 A1 * | 12/2010 | Kennedy | 126/652 |
| 2011/0151276 A1 * | 6/2011 | Wiklund | C23C 14/16 |
| | | | 428/673 |
| 2011/0262742 A1 * | 10/2011 | Takeuchi | C23C 28/04 |
| | | | 428/339 |
| 2011/0308513 A1 * | 12/2011 | Martinez-Val Penalosa | F24J 2/265 |
| | | | 126/655 |
| 2013/0040148 A1 * | 2/2013 | Masuda et al. | 428/421 |

FOREIGN PATENT DOCUMENTS

| | | |
|---|---|---|
| DE | 28 11 393 | 9/1979 |
| DE | 101 50 738 | 5/2003 |
| DE | 10 2004 010 689 | 6/2005 |
| DE | 10 2004 060 982 | 11/2006 |
| DE | 10 2005 057 277 | 6/2007 |
| DE | 20 2006 009 369 | 10/2007 |
| DE | 10 2006 056 536 | 2/2008 |
| DE | 10 2008 010 199 | 8/2009 |
| EP | 1 916 098 | 4/2008 |
| JP | 6-71804 | 3/1994 |
| WO | 2005/010225 | 2/2005 |

OTHER PUBLICATIONS

C.E. Kennedy, "Review of Mid-To-High-Temperature Solar Selective Absorber Materials", Technical Report of the National Renewable Energy Laboratory, Jul. 2002 Edition.

European Office Action dated Aug. 29, 2018 in European Application No. 10005210.9-1108 with English translation of the relevant parts.

Indian Search dated Jun. 21, 2017 in Indian Application No. 1386/CHE/2010 (in English).

Examination Report provided by Korean Intellectual Property Office dated Jul. 4, 2017 in UAE Application No. UAE/P/0558/2010 (in English).

UAE Search Report dated Mar. 26, 2019 in UAE Application No. P558/2010 (in English).

* cited by examiner

RADIATION-SELECTIVE ABSORBER COATING AND ABSORBER TUBE WITH RADIATION-SELECTIVE ABSORBER COATING

CROSS-REFERENCE

The invention described and claimed herein below is also described in German Patent Application 10 2009 022 059.3, which was filed on May 20, 2009 in Germany. The aforesaid German Patent Application provides the basis for a claim of priority of invention for the invention claimed herein below under 35 U.S.C. 119 (a)-(d).

U.S. patent application Ser. No. 12/903,625, filed on Oct. 13, 2010, and U.S. patent application Ser. No. 12/372,070, filed on Feb. 17, 2009, also disclose and claim radiation-selective absorber coatings for solar power generating applications, which may be related to the radiation-selective absorber coatings disclosed and claimed in the following specification.

BACKGROUND OF THE INVENTION

1. The Field of the Invention

The invention relates to a radiation-selective absorber coating, in particular for an absorber tube of a parabolic trough collector, which comprises a reflective layer that reflects in the infrared range, at least one barrier layer arranged below the reflective layer, at least one absorption layer arranged above the reflective layer and an antireflection layer arranged above the absorption layer. The invention also relates to an absorber tube that has the aforesaid radiation-selective coating, and to a method of operating a parabolic trough collector using this sort of absorber tube. Parabolic trough collectors are used for generating power in solar power plants.

2. The Description of the Related Art

Customary absorber coatings consist of a layer which is reflective in the infrared range and is applied on a substrate, in particular a metal tube, and also a cermet layer having a high absorptance in the range of the solar spectrum and a covering layer applied on the cermet layer, which covering layer is referred to as an antireflection layer and, owing to the high refractive index of the cermet layer, is provided for reducing the surface reflection on the cermet layer.

A fundamental endeavor is to achieve an energy yield that is as high as possible. The energy yield is dependent, inter alia, on the coefficients of the absorptance $\alpha$ and the emissivity $\varepsilon$. Efforts are focussed on obtaining an absorber coating with a high absorptance ($\alpha \geq 95\%$) and a low emissivity ($\varepsilon \leq 10\%$).

Furthermore, the efficiency of a solar power plant is determined by the operating temperature of the collector array. From this standpoint, a temperature that is as high as possible is desired. Contrary to this, the durability of the layer system of the absorber coating decreases, however, with increasing operating temperature on account of ageing and/or diffusion processes, as a result of which, for example, the absorption property of the cermet layer and the reflection property of the reflective layer that reflects in the infrared range can decline significantly.

Molybdenum is usually used for the reflective layer that reflects in the infrared range. However, the reflection properties of a molybdenum layer are not optimal, and so it is desirable to use better reflective materials. Therefore, other materials having better IR reflection properties such as copper or silver are also used for the reflective layers which are reflective in the IR range.

The operating temperature of known absorber tubes is 300-400° C. For the reasons above, what is fundamentally striven for is to increase the operating temperature further, but without impairing, for example, the absorption properties of the cermet layer and the reflection properties of the reflective layer that is reflective in the infrared range.

Such endeavors are summarized in C. E. Kennedy, "Review of Mid- to High-Temperature Solar Selective Absorber Materials", Technical Report of the National Renewable Energy Laboratory, July 2002 edition. This reference discloses a layer construction composed of a $ZrO_xN_y$ or $ZrC_xN_y$ absorption layer and a layer of Ag or Al which is reflective in the IR range. This layer structure has improved thermal stability in air by virtue of the introduction of an $Al_2O_3$ diffusion barrier layer. It was furthermore ascertained that the thermal stability of the infrared reflection layer under reduced pressure can be improved by the introduction of a diffusion barrier layer below this layer. For this barrier layer, $Cr_2O_3$, $Al_2O_3$ or $SiO_2$ are proposed as the layer material. The hope is to achieve stability of the silver reflection layer up to 500° C.

However, this does not end the striving for more durable layers in conjunction with still good absorptance and emissivity.

Therefore, DE 10 2006 056 536 A1 describes a radiation-selective absorber coating comprising at least two barrier layers, a layer which is reflective in the IR range and is arranged thereon, an absorption layer arranged above the reflective layer, and an antireflection layer arranged above the absorption layer, which have a high solar absorptance and a low thermal emissivity.

Although the adhesion of the IR-reflective layer, which preferably consists of silver, is sufficient, it is still in need of improvement. In particular, it has been found that the substrate pretreatment in the production process has a great influence on the layer adhesion. Thus, the layer adhesion can be adversely influenced for example by relatively long storage times or external influences, such as moisture or particle entry prior to coating.

DE 20 2006 009 369 U1 describes a composite material for a solar collector element which contains, in its layer system, a separating layer comprising at least one partial layer consisting of plastic.

SUMMARY OF THE INVENTION

In this context, it is an object of the invention to provide an absorber coating whose individual layers have very good adhesion, such that the absorber coating is intrinsically stable and insensitive to external influences that fluctuate in a manner given by production. It is furthermore an object of the invention to provide an absorber tube having such a coating and a method of operating a parabolic trough collector in which this sort of absorber tuba is used.

These objects are achieved by the absorber coating, the absorber tube, and the method recited in the independent patent claims appended herein below, and by virtue of the fact that at least one adhesion-enhancing layer is arranged between the barrier layer and the reflective layer that reflects in the IR range.

The radiation-selective absorber coating according to the invention, in particular for absorber tubes of parabolic trough collectors, therefore has: at least one reflective layer that is reflective in the infrared range, at least one barrier layer arranged below the reflective layer, at least one absorption layer arranged above the reflective layer, an antireflection layer arranged above the absorption layer, and an adhesion-enhancing layer between the barrier layer and the reflective layer.

The adhesion-enhancing layer preferably has a thickness of 5 nm to 50 nm. With a smaller thickness, an area-covering effect is no longer ensured on account of the layer thickness fluctuation caused by the sputtering process. With other coating methods enabling a better coating homogeneity, layer thicknesses which are less than 5 nm and which bring about sufficient adhesion promotion should, if appropriate, also be able to be deposited. With a thickness greater than 50 nm, no improvement in adhesion promotion is detectable and, at the same time, as a result of higher thicknesses, inherent stresses in the adhesion promoter layer can be built up which have an adverse effect on the overall layer system. A thickness of 10 nm to 20 nm is particularly preferred.

Preferably, the adhesion-enhancing layer comprises molybdenum, copper, silicon or titanium or titanium oxide or consists of molybdenum, copper, silicon or titanium or titanium oxide. It is particularly preferred for the adhesion-enhancing layer to consist of molybdenum.

Silicon is well suited as material for the adhesion-enhancing layer and achieves the object of the invention, that is to say that it has a sufficient adhesion capability. However, the latter is not as outstanding as that of molybdenum. Copper is well suited as the material of the adhesion-enhancing layer and achieves the object of the invention, but is primarily preferably used in the case of absorber tubes with low operating temperatures since the thermal stability of copper declines starting from 300° C. Both titanium and titanium oxide are well suited as the material of the adhesion-enhancing layer and achieve the object of the invention.

Molybdenum as the material of the adhesion-enhancing layer is therefore especially preferred in combination with silver as IR-reflective layer, since an absorber coating with silver as IR-reflective layer is preferably used for absorber tubes with high operating temperatures on account of the high thermal stability of the silver. The molybdenum has no optical function in this position in the layer stack below the IR-reflective layer. This adhesion-enhancing layer is optically inactive.

Preferably plural barrier layers are arranged below the IR-reflective layer, in other words also below the adhesion-enhancing layer.

This is because it has been found that the screening of the layer which is reflective in the IR range and also of the adhesion-enhancing layer with respect to the substrate by an at least two-layered barrier effectively prevents diffusion, in particular thermally governed diffusion, of the substrate material, in particular of iron, from the steel absorber tube into the layer which is reflective in the IR range, and hence increases the long-term thermal stability of the coating.

This is very successful particularly when a first barrier layer of the at least two barrier layers consists of a thermally produced oxide. By way of example, chromium iron oxide is well suited as thermally produced oxide. It is also very successful particularly when a second barrier layer of the at least two barrier layers consists of an $Al_xO_y$ compound. AlO, $AlO_2$ and $Al_2O_3$ are preferred as aluminium oxides. $Al_2O_3$, in particular, is preferred from said aluminium oxides. It is also very successful particularly when a second barrier layer of the at least two barrier layers consists of a $SiO_x$ compound, in which x can assume the values 1 to 2. Particularly preferably, x=2, the values between 1 and 2 are also possible.

The at least one barrier layer is free of plastic. In particular, partial layers composed of plastic or plastic components in the layer or layers are not included in the at least one barrier layer.

Preferably, a third barrier layer is arranged between the layer which is reflective in the IR range and the absorption layer, which advantageously consists of cermet, said third barrier layer preferably consisting of an $Al_xO_y$ compound, where x can assume the values 1 or 2 and y can assume the values 1, 2 or 3. As an alternative, a third barrier layer composed of a $SiO_x$ layer is preferred, where x can assume the values 1 to 2 and preferably assumes the value 2.

The embedding of the layer which is reflective in the IR range and of the adhesion-enhancing layer between two aluminium oxide and/or silicon oxide layers and the associated formation of a type of sandwich has the advantage that it is also impossible for any material from the layer which is reflective in the infrared range to diffuse into the overlying absorption layer and in this way to impair the absorption properties of the absorption layer. The substantial suppression of diffusion within the layer system, in particular into or from the reflective layer which is reflective in the IR range, and into the absorption layer, can thus be ensured.

In this way, it is possible to demonstrate a high absorption where a 95% and a low emissivity where $\varepsilon \leq 10\%$ at an operating temperature of 590° C. under reduced pressure over a period of >1000 hours. The high solar absorption and low thermal emission have a positive effect on the efficiency of a collector comprising an absorber tube provided with this coating equally from two standpoints: the improved selectivity ratio $\alpha/\varepsilon$ 0.95/0.1 means a higher yield of the radiation energy, and an increased operating temperature enables more efficient conversion into electrical energy. Only a long lifetime of such a coating ensures the economic operation of a corresponding parabolic trough collector comprising absorber tubes coated in this way.

The high thermal stability of the absorber coating now allows operating temperatures for the absorber tubes of >450° C.

It is advantageously possible to use a heat carrier medium having a boiling point of <110° C., in particular water. At such high operating temperatures, water vapor arises, which can be introduced directly into steam turbines. Additional heat exchangers for the transfer of the heat from the oil used heretofore to water are no longer required, and so, from this standpoint, parabolic trough collectors comprising absorber tubes with an absorber coating according to the invention can be operated much more economically viably than has been the case heretofore.

A further advantage is that, in the case of operational disturbances of the power plant which leads to increased absorber tube temperatures, the absorber layers are not directly damaged and are thus better suited to operation since they afford a higher degree of fail-safety.

Preferably, the thickness of the barrier layers, in particular of the silicon oxide and/or aluminium oxide layers, is between 5 nm and 100 nm, preferably between 5 nm and 70 nm, particularly preferably at most 50 nm, especially preferably between 15 nm and 40 nm. In the case of thicknesses of <5 nm, depending on the composition of the adjoining layers, the barrier effect of the silicon oxide and/or aluminium oxide layer is not satisfactory. In the case of thicknesses of greater than 100 nm, thermal stresses occur, which under certain circumstances might lead to layer detachment.

The thicknesses of the two barrier layers, in particular of the silicon oxide and/or aluminium oxide layers, can be different, the thickness of the lower layer, in particular of a silicon oxide layer, preferably being greater than the thickness of the upper oxide layer. Preferably, the layer thickness of the barrier layer or of the barrier layers which is or are arranged between the substrate and the adhesion-enhancing layer is 5 nm to 100 nm, preferably 10 nm to 70 nm, particularly preferably 15 to 70 nm, especially preferably 30 nm±10 nm, and the layer thickness of the barrier layer which is arranged between the reflective layer which is reflective in the IR range and the absorption layer is 0 nm to 50 nm, and depending on the composition of the layers preferably 30 nm to 40 nm or else 5 nm to 15 nm.

Materials such as silver, copper, platinum or gold can be used for the reflective layer that is reflective in the infrared range. Preferably, this reflective layer comprises gold, silver, platinum or copper or consists of gold, silver, platinum or copper. These materials have very good reflectivity in the infrared range, such that an emissivity $\varepsilon < 10\%$ can be achieved. It is particularly preferred that this reflective layer consists of silver.

The thickness of the layer which is reflective in the infrared range is preferably 50 nm to 250 nm, depending on the material. Within this thickness range, a layer thickness of 100 nm to 150 nm is preferred if, in particular, copper or silver is used. Particularly when silver is used, preference may also be given to layer thicknesses in the range of 60 nm to 150 nm, preferably of 80 nm to 150 nm. 110 nm±10 nm is especially preferred. In other cases, layer thicknesses of 50 to 100 nm, in particular 50 to 80 nm, are also appropriate.

These small layer thicknesses for the reflective layer that is reflective in the infrared range are possible because the materials gold, silver, platinum and copper have a very high reflectivity and, in a preferred embodiment, as a result of the packing of the reflective layer and the adhesion-enhancing layer between two barrier layers, cannot diffuse away into other layers or are not impaired in terms of their positive properties as a result of the diffusion of other, disturbing elements into them.

The higher cost of the noble metals Au, Ag and Pt can be compensated for, in some instances even overcompensated, by the significantly smaller layer thickness by comparison with the known layer thicknesses for the reflective layer that is reflective in the infrared range.

The thickness of the absorption layer is preferably 60 nm to 180 nm, more particularly preferably 80 nm to 150 nm. The absorption layer is preferably a cermet layer composed of aluminium oxide with molybdenum or composed of zirconium oxide with molybdenum. Instead of a homogeneous absorption layer, it is also possible to provide a plurality of absorption layers having different compositions, in particular with decreasing metal proportion, or a gradually variable absorption layer. The cermet layer is preferably a gradient layer, which is understood to mean a layer in which the metal proportion within the layer increases or decreases continuously, and also in steps in practice.

The layer thickness of the antireflection layer situated on the absorption layer is preferably 60 nm to 120 nm, preferably 70 nm to 110 nm. This layer preferably consists of silicon oxide or aluminium oxide.

The absorber tube according to the invention, particularly for a parabolic trough collector, comprising a steel tube, on the outer side of which is arranged a radiation-selective absorber coating comprising at least one reflective layer that is reflective in the infrared range, at least one absorption layer, in particular composed of cermet material, and an antireflection layer arranged above the absorption layer, at least one barrier layer arranged between the steel tube and the reflective layer. This absorber coating is characterized in that at least one adhesion-enhancing layer is arranged between the barrier layer and the reflective layer according to the invention. The absorber tube preferably has a radiation-selective absorber coating in the embodiment outlined as preferred for the absorber coating. The absorber tube particularly preferably has an absorption coating comprising an adhesion-enhancing layer composed of molybdenum. The absorber tube particularly preferably has an absorption coating comprising an adhesion-enhancing layer having a thickness of 5 nm to 30 nm. The absorber tube particularly preferably has an absorption coating comprising an IR-reflective layer composed of silver.

According to the invention the method of operating a parabolic trough collector with at least one absorber tube through which a heat carrier medium is passed, comprises passing a heat carrier medium having a boiling point less than 110° C. through the at least one absorber tube and providing the at least one absorber tube with a radiation-selective absorber coating according to the invention, which comprises a reflective layer which is reflective in the infrared range, at least one absorption layer, in particular composed of cermet material, arranged above the reflective layer, an antireflection layer arranged above the absorption layer, at least one barrier layer arranged between the absorber tube and the reflective layer, and at least one adhesion-enhancing layer. Water, in particular, can be used as the heat carrier liquid.

In accordance with a further embodiment, the method of operating the parabolic trough collector comprises setting the operating temperature of the absorber tube or tubes to a temperature of 450° C. to 550° C., in particular 480° C. to 520° C.

The method of operating a parabolic trough collector is preferably operated with absorber tubes having the above-described preferred embodiments of the radiation-selective absorber coating according to the invention.

BRIEF DESCRIPTION OF THE DRAWING

Exemplary embodiments of the invention are illustrated in greater detail herein below with reference to the following figures, in which.

DESCRIPTION OF THE PREFERRED EMBODIMENT

Figure 1:
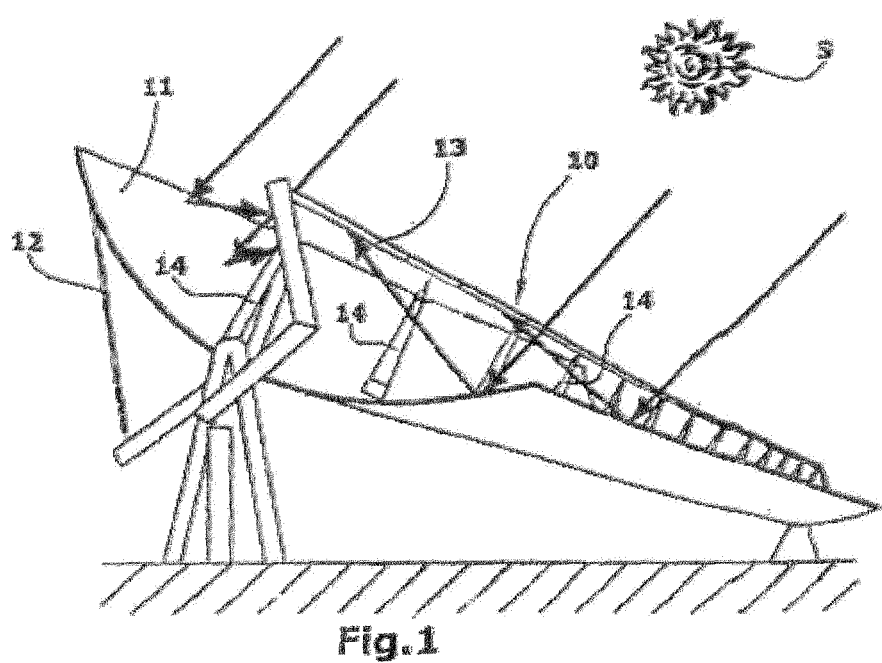
FIG. 1 is a perspective view of a parabolic trough collector.

FIG. 1 illustrates a parabolic trough collector 10, which has an elongated parabolic reflector 11 with a parabolic profile. This parabolic trough collector 10 has a structure that is generally known in the art. The parabolic reflector 11 is held by a support structure 12. Along the focal line of the parabolic reflector 11 there extends an absorber tube 13, which is fixed to supports 14 connected to the parabolic trough collector. The parabolic reflector 11 forms a unit with the supports 14 and the absorber tube 13, which unit is pivoted about the axis of the absorber tube 13 and thereby tracked uniaxially to the position of the sun S. The parallel solar radiation incident from the sun S is focused by the parabolic reflector 11 onto the absorber tube 13. A heat carrier medium, in particular water, flows through the absorber tube 13, the latter being heated by the solar radiation absorbed. At the outlet end of the absorber tube, the heat transfer medium can be withdrawn and fed to an energy consumer or converter.

Figure 2:
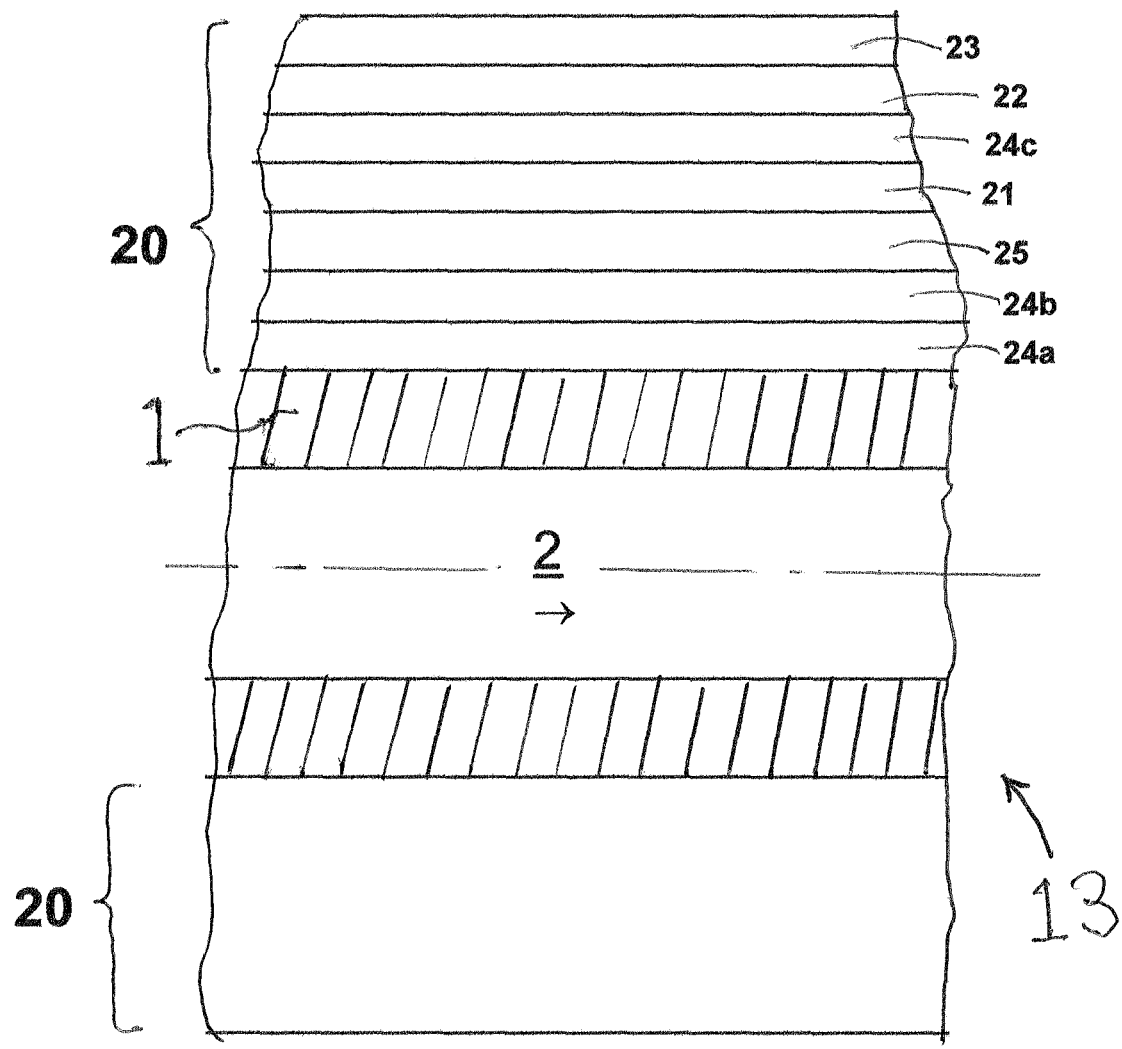
FIG. 2 is a diagrammatic cross-sectional view through an absorber tube in accordance with one embodiment of the invention.

FIG. 2 schematically illustrates a section through an absorber tube 13 according to the invention. The absorber tube 13 has a steel tube 1, through which the heat carrier medium 2 flows and which forms the substrate for the absorber coating 20 applied on the outer side of the tube 1. The layer thicknesses of the individual layers of the absorber coating 20 are depicted as enlarged for simple illustration and with approximately equal thicknesses.

The absorber coating 20 has, from the inside outwards, a first barrier or diffusion barrier layer 24a composed of chromium iron oxide applied on the steel tube 1 by means of thermal oxidation. On this, between a second barrier layer 24b composed of $SiO_x$, preferably composed of $SiO_2$, and a third barrier layer 24c, preferably composed of silicon oxide or aluminium oxide, there is embedded an adhesion-enhancing layer 25 composed of molybdenum and on the latter a reflective layer 21 which is reflective in the infrared range and is composed of silver. A cermet layer 22 is applied on and over the third barrier layer 24c, and the layer system 20 terminates towards the outside with an antireflection layer 23, preferably composed of silicon oxide.

The absorber tube in accordance with the embodiment of FIG. 2 is coated by the method described below.

The steel tube 1, preferably a stainless steel tube, is polished and then cleaned. A surface roughness $R_a$ of <0.2 μm is preferably achieved during polishing. The stainless steel tube is subsequently oxidized thermally at a temperature of >400° C. for approximately half an hour to 2 hours, in particular at 500° C. for approximately 1 hour. In the process, an oxide layer having a thickness of 15 nm to 50 nm, preferably 30 nm±10 nm, which is the first barrier layer 24a.

Subsequently, the steel tube is introduced into a vacuum coating installation and the installation is evacuated. After a pressure of less than $5 \times 10^{-4}$ mbar, preferably $1 \times 10^{-4}$ mbar, has been attained, the subsequent layers are applied by means of physical vapor deposition (PVD), in particular by means of cathode sputtering. For this purpose, the steel tube is led in rotating fashion past sputtering sources, i.e. past targets consisting of the coating substances, for example Al, Si, Ag and Mo.

In the first deposition step, the second barrier layer 24b is applied in the form of a $SiO_x$ layer, by silicon being evaporated or sputtered and deposited reactively with supply of oxygen. An oxygen pressure of between $10^{-2}$ mbar and $10^3$ mbar, preferably $4 \times 10^{-3}$ mbar to $7 \times 10^{-3}$ mbar, is set in this case. The preferred layer thickness of this second barrier layer is 10 nm to 70 nm, and particularly preferably 30 nm±10 nm.

In the subsequent second deposition step, the adhesion-enhancing layer 25 is applied on the second barrier layer 24b, by depositing preferably molybdenum, but also silicon or copper, with a layer thickness of 5 nm to 50 nm, preferably of 10 nm to 20 nm, on the second barrier layer 24b.

In the subsequent third deposition step, the layer 21 which is reflective in the infrared range is applied, by depositing gold, silver, platinum, or copper, preferably silver, with a thickness of 60 nm to 150 nm, particularly preferably of 110 nm±10 nm, on the adhesion-enhancing layer 25.

In the fourth deposition step, the third barrier layer 24c is applied in the form of a further $SiO_x$— or $Al_xO_y$ layer, by silicon or aluminium being evaporated as in the case of the second barrier layer and deposited reactively with supply of oxygen. The preferred layer thickness of this third barrier layer is at most 50 nm, particularly preferably 10 nm±5 nm. However, this barrier layer can also be completely dispensed with, since it has been found that, given a suitable composition of the absorption layer 22 applied on the reflection layer 21, diffusion does not have to be inhibited by an additional barrier.

In the fifth deposition step, the absorption layer or more precisely in this case the cermet layer 22 is applied by simultaneous evaporation/sputtering of aluminium and molybdenum from one common crucible or from two separate targets. In this case, oxygen is preferably introduced simultaneously into the evaporation/sputtering region in order also to (reactively) deposit aluminium oxide besides aluminium and molybdenum.

In this case, in the fifth deposition step, the composition can be set differently and even varied in the course of the step by appropriate selection of the operating parameters (evaporation/sputtering rate and amount of oxygen). Particularly when separate targets are used, the deposition of the molybdenum proportion can thus be configured variably relative to the deposition of the aluminium and/or aluminium oxide proportion in the absorption layer 22. In other words, the molybdenum proportion of the absorption layer 22 is configured as a gradient, in which case it is preferably lowered during application of the absorption layer 22. On the inside, it is preferably 25% by volume to 70% by volume, particularly preferably 40±15% by volume, and decreases in the outward direction to 10% by volume to 30% by volume, particularly preferably 20±10% by volume.

Oxygen is preferably added substoichiometrically in relation to the aluminium proportion deposited, such that a non-oxidized aluminium proportion remains in the absorption layer 22. This is then available as redox potential or oxygen getter, such that there is no formation of molybdenum oxide. The non-oxidized aluminium proportion in the absorption layer 22 is preferably less than 10% by volume, particularly preferably between 0 and 5% by volume, based on the overall composition of the absorption layer. The non-oxidized aluminium proportion can likewise be varied within the absorption layer by altering the operating parameters of evaporation rate and amount of oxygen.

Overall, the absorption layer 22 is preferably applied with a thickness of 60 nm to 180 nm, particularly preferably with a thickness of 80 nm to 150 nm, especially preferably with 120±30 nm.

In the sixth deposition step, the antireflection layer 23 is applied in the form of a $SiO_2$ layer, by depositing it by means of physical vapor deposition of silicon with supply of oxygen. The preferred thickness of the antireflection layer 23 thus deposited is 70 nm to 110 nm, particularly preferably 90±10 nm.

An absorber tube produced in this way was heated at 590° C. for 1400 h in a vacuum heating apparatus. The pressure in the vacuum chamber was less than $1 \times 10^{-4}$ mbar during this heating period. After the heating had been switched off and the sample had been cooled to below 100° C., the vacuum chamber was ventilated and the sample was removed. The sample was subsequently analyzed spectrophotometrically, in the course of which it was possible to determine an integral solar absorptance a of 95%±0.5% for an AM 1.5 direct solar spectrum and the wavelength range of 350-2500 nm. The thermal emissivity ε for a substrate temperature of 400° C. (BB400) was determined to be 10%±1%. The following table I shows the profile of α and ε as a function of the heating time.

TABLE I

α and ε as a Function of Heating Time

| Time [h] | α [%] | ε (BB400) [%] |
|---|---|---|
| 0 | 95.7 | 10.9 |
| 24 | 95.2 | 9.7 |
| 56 | 95.1 | 10.1 |
| 126 | 95.0 | 9.9 |
| 190 | 95.0 | 9.8 |
| 250 | 95.1 | 10.1 |
| 300 | 95.0 | 9.7 |
| 460 | 95.2 | 10.5 |
| 610 | 94.9 | 10.0 |
| 1000 | 94.9 | 10.0 |
| 1150 | 94.9 | 10.1 |
| 1260 | 95.1 | 10.4 |
| 1400 | 94.9 | 9.8 |

In a vacuum coating installation, by means of DC magnetron sputtering and MF magnetron sputtering, the layer system described was produced respectively with an adhesion promoting layer 25 and without an adhesion promoting layer 25. After coating, layer adhesion tests were carried out. In this case, an adhesive tape having a strong adhesive effect was applied on the coating and pulled off by means of a force measuring device. A pull-off value of <15 N resulted here in the case of the coating without an adhesion promoter layer. Partial- to whole-area delamination of the coating was simultaneously observed. Pull-off values of up to 5 N and only little to no delamination resulted when an adhesive tape having a low adhesive effect was used. On the samples produced with an adhesion promoter layer, when the strongly adhering adhesive tape was pulled off, pull-off values of up to 40 N resulted, without delamination of the coating. The same results arose for samples that were aged at 550° C. for 100 h.

The absorption coating according to the invention therefore has not only the other required properties such as e.g. high solar absorptance and low thermal emissivity (α≥95%, ε≤10%, at substrate temperature of 400° C.) but also intrinsically a high stability and a good adhesion of the individual layers among one another. In particular the adhesion of the layer which is reflective in the IR range is significantly improved by comparison with the prior art. The adhesion-enhancing effect of the adhesion promoting layer 25 is manifested both in contact with the layer 21 which is reflective in the infrared range, particularly if said layer consists of silver, and in contact with the barrier layer 24b, particularly if the latter consists of silicon oxide.

PARTS LIST

1 Steel tube
2 Heat carrier liquid
10 Parabolic trough collector
11 Parabolic reflector
12 Support structure
13 Absorber tube
14 Support
20 Radiation-selective absorber coating
21 IR Reflective Layer
22 Absorption layer
23 Antireflection layer
24a First barrier layer
24b Second barrier layer
24c Third barrier layer
25 Adhesion-enhancing layer While the invention has been illustrated and described as embodied in a radiation-selective absorber coating and an absorber tube provided with the radiation-selective absorber coating, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An absorber tube (13), in particular for a parabolic trough collector, said absorber tube (13) comprising a steel tube (1), on the outer side of which is applied a radiation-selective absorber coating (20), and
    wherein said radiation selective absorber coating (20) consists of a reflective layer (21) which is reflective in the infrared range, at least one absorption layer (22) arranged above the reflective layer (21), an antireflection layer (23) arranged above the absorption layer (22), at least one barrier layer (24) arranged on an outer surface of the steel tube between the steel tube (1) and the reflective layer (21), at least one adhesion-enhancing layer (25) arranged between the at least one barrier layer (24) and the reflective layer (21), and an additional barrier layer (24c) arranged between the at least one absorption layer (22) and the reflective layer (21);
    wherein the at least one barrier layer is free of plastic;
    wherein said reflective layer (21) is arranged on the at least one adhesion-enhancing layer (25), and wherein the reflective layer (21) consists of gold, silver, platinum or copper;
    wherein the at least one adhesion-enhancing layer consists of molybdenum and has a thickness of 5 nm to 30 nm;
    wherein said at least one barrier layer has a thickness of 5 nm to 100 nm and consists of a layer (24a) and another layer (24b) arranged on said layer (24a);
    wherein said layer (24a) consists of an iron-containing oxide and is made by thermal oxidation of an outer surface of said steel tube and said another layer (24b) consists of an $SiO_x$ compound, wherein x is 1 to 2;
    wherein said at least one adhesion-enhancing layer (25) is arranged on said another layer (24b);
    wherein said additional barrier layer (24c) consists of an $SiO_x$ compound, wherein x is 1 to 2; and
    wherein the radiation selective absorber coating is stable at operating temperatures of the absorber tube over 450° C.

2. The absorber tube according to claim 1, wherein the radiation selective absorber coating has a thermal emissivity ε of less than or equal to 10%.

3. The absorber tube according to claim 1, wherein the radiation selective absorber coating has a solar absorptance α of great than or equal to 95%.

4. A radiation-selective absorber coating (20) for an iron or steel substrate, said absorber coating (20) consists of a reflective layer (21) that reflects in the infrared range, at least one barrier layer (24) arranged below the reflective layer (21), at least one absorption layer (22) arranged above the reflective layer (21), an additional barrier layer (24c) arranged between the at least one absorption layer (22) and the reflective layer (21), an antireflection layer (23) arranged above the at least one absorption layer (22), and at least one adhesion-enhancing layer (25) arranged between the at least one barrier layer (24) and the reflective layer (21);

wherein the at least one barrier layer is free of plastic and has a thickness of 5 nm to 100 nm;

wherein said at least one adhesion-enhancing layer has a thickness of from 5 nm to 30 nm and consists of molybdenum;

wherein said reflective layer (21) is arranged on the at least one adhesion-enhancing layer (25), and wherein the reflective layer (21) consists of gold, silver, platinum or copper;

wherein said at least one barrier layer consists of a layer (24a) and another layer (24b) arranged on said layer (24a), wherein said layer (24a) consists of an iron-containing oxide and is made by thermal oxidation of an outer surface of said iron or steel substrate;

wherein said another layer (24b) consists of an $SiO_x$ compound, wherein x is 1 to 2; and wherein said at least one adhesion-enhancing layer (25) is arranged on said another layer (24b);

wherein said additional barrier layer (24c) consists of an $SiO_x$ compound, wherein x is 1 to 2: and wherein the radiation selective absorber coating is stable at operating temperatures of the absorber tube over 450° C.

5. The radiation selective absorber coating according to claim 4, wherein the coating has a thermal emissivity ε of less than or equal to 10%.

6. The absorber tube according to claim 4, wherein the radiation selective absorber coating has a solar absorptance α of greater than or equal to 95%.

7. The absorber coating according to claim 4, wherein the reflective layer (21) that reflects in the infrared range consists of said silver.

8. The absorber coating according to claim 4, wherein the reflective layer (21) that is reflective in the infrared range has a thickness from 50 nm to 250 nm.

9. The absorber coating according to claim 8, wherein the thickness of the reflective layer (21) is from 80 to 150 nm.

10. The absorber coating according to claim 4, wherein the adhesion-enhancing layer (25) has a thickness from 10 nm to 20 nm.

* * * * *